(12) United States Patent
Pearson (10) Patent No.: US 7,702,530 B2
(45) Date of Patent: Apr. 20, 2010

(54) SYSTEMS AND METHODS FOR CONSUMERS TO PURCHASE HEALTH CARE AND RELATED PRODUCTS

(75) Inventor: Mark Pearson, Los Gatos, CA (US)

(73) Assignee: Lifespring Health Network LLC, Los Gatos, CA (US)

( * ) Notice: Subject to any disclaimer, the term of this patent is extended or adjusted under 35 U.S.C. 154(b) by 1622 days.

(21) Appl. No.: 10/669,132

(22) Filed: Sep. 22, 2003

(65) Prior Publication Data

US 2005/0027607 A1    Feb. 3, 2005

Related U.S. Application Data

(60) Provisional application No. 60/491,205, filed on Jul. 29, 2003.

(51) Int. Cl.
*G06Q 40/00* (2006.01)

(52) U.S. Cl. .......................................................... 705/4

(58) Field of Classification Search ..................... 705/2, 705/4
See application file for complete search history.

(56) References Cited

U.S. PATENT DOCUMENTS

| 5,706,441 | A | 1/1998 | Lockwood | |
|---|---|---|---|---|
| 6,119,229 | A * | 9/2000 | Martinez et al. | 726/28 |
| 6,424,951 | B1 * | 7/2002 | Shurling et al. | 705/14 |
| 6,578,012 | B1 | 6/2003 | Storey | 705/14 |
| 6,594,640 | B1 | 7/2003 | Postrel | 705/14 |
| 6,826,541 | B1 | 11/2004 | Johnston et al. | |
| 6,965,868 | B1 * | 11/2005 | Bednarek | 705/9 |
| 7,110,976 | B2 * | 9/2006 | Heimermann et al. | 705/37 |
| 7,174,302 | B2 * | 2/2007 | Patricelli et al. | 705/4 |
| 7,359,871 | B1 * | 4/2008 | Paasche et al. | 705/26 |
| 7,383,198 | B1 * | 6/2008 | Sepe | 705/8 |
| 2001/0025253 | A1 | 9/2001 | Heintz | 705/14 |
| 2001/0037214 | A1 | 11/2001 | Raskin et al. | |
| 2002/0059359 | A1 | 5/2002 | Curry | 709/201 |
| 2002/0099601 | A1 | 7/2002 | Farrell | 705/14 |
| 2002/0174011 | A1 | 11/2002 | Sanchez et al. | 705/14 |
| 2003/0036952 | A1 | 2/2003 | Panttaja et al. | 705/14 |
| 2003/0105676 | A1 | 6/2003 | Mishima | 705/26 |
| 2003/0120511 | A1 | 6/2003 | Legnini | |
| 2003/0130895 | A1 | 7/2003 | Antonucci et al. | 705/14 |
| 2003/0200144 | A1 | 10/2003 | Antonucci et al. | 705/14 |
| 2003/0236704 | A1 | 12/2003 | Antonucci | 705/14 |
| 2003/0236729 | A1 | 12/2003 | Epstein et al. | 705/36 |
| 2004/0039644 | A1 | 2/2004 | Postrel | 705/14 |
| 2004/0064371 | A1 | 4/2004 | Crapo | 705/14 |
| 2004/0073480 | A1 | 4/2004 | Nahmias | 705/14 |
| 2004/0093269 | A1 | 5/2004 | Rubin et al. | 705/14 |
| 2004/0098317 | A1 | 5/2004 | Postrel | 705/26 |
| 2004/0107140 | A1 | 6/2004 | Postrel | 705/14 |

* cited by examiner

*Primary Examiner*—C. Luke Gilligan
*Assistant Examiner*—Reginald Reyes
(74) *Attorney, Agent, or Firm*—Paul Davis; Goodwin Procter LLP (57) ABSTRACT

A method of selling a health related product or service via the Internet provides a service provider system that includes a web server. The service provider system has members that purchase health related products and services through the service provider system. Applicants are enrolled in the service provider system as members. A product or service request message is received for a desired product or service from a member through a customer interface. The product or service request message includes a product or service identifier. The service provider system transmits a request for the desired product or service request to a supplier of the desired product or service. Points are recorded within a computer memory awarded to a member for purchases made by the member through the service provider system.

11 Claims, 8 Drawing Sheets

SYSTEMS AND METHODS FOR CONSUMERS TO PURCHASE HEALTH CARE AND RELATED PRODUCTS

CROSS-REFERENCE TO RELATED APPLICATION

This applications claims the benefit of 60/491,205 filed Jul. 29, 2003, which application is fully incorporated herein by reference.

FIELD OF THE INVENTION

The present invention is directed to methods and systems directed to medical care and health insurance, and more particularly to, methods and systems for consumers to reduce or eliminate the cost of obtaining high quality medical care and health insurance by purchasing for their own use such care products and insurance for themselves as well as making recommendations to third parties for the acquisition of the same.

DESCRIPTION OF THE RELATED ART

There are currently more than 41 million Americans who are uninsured. Most of the 41 million are younger workers who are unaware that their expenditures for health care through physicians and hospitals exceeds that paid by insurance companies for the same service. In 2002, only 62% of businesses that employ 10-49 people offered a health plan. In 2001, the number was 66%. Approximately 60% of the 41 million Americans who lack medical insurance are members of families that either own or work for small businesses. Small companies that sign with a new insurance carrier undergo extensive healthcare underwriting and pay more in premiums than larger companies. Additionally, the average health insurance premiums rose 14.8% to $4,564 per employee in 2002.

In 1986, the Consolidation Omnibus Reconciliation Act (COBRA) was enacted and mandated that terminated employees are allowed to purchase health insurance from their former employer for up to 18 months after termination. However, the cost of the continued insurance benefits is fairly high, and few terminated employees can afford the insurance, especially without the income tax advantages of employer paid insurance. Only 21% elect to purchase COBRA From 1965-2002 the costs of health care costs grew from 5% to 14.7% of GDP. It is estimated that lifestyle behaviors alone contribute to 50% of an individual's health status. Today, there are less employers that offer insurance, and for those that do provide health insurance the costs to the employees have increased. As a consequence, consumers are taking more of the financial risks associated with health care.

It is anticipated that in ten years, employers will be paying a smaller share of overall health care costs and employees will be paying more. In 2002 PPO enrollment jumped to 52% of all covered workers up from 28% in 1996, and enrollment in HMOs fell to 26% from 31% in 1996. The White House proposed spending $89 billion in new tax credits over 10 years to help low income people buy health coverage, congress has set aside $50 billion in its budget. Congress has proposed and passed the H.R. 2596, the Health Savings& Affordability Act of 2003, passed by a vote of 237-191. (Jun. 26, 2003), which provides for Health Savings Accounts (HAS): The annual contribution limit is 100% of the deductible under the health plan. This may be between $1,000-$2,500 (self coverage policies) and $3,350-$6,150 (family policies). Also proposed are Health Savings Security Accounts (HSSA). Individuals with self coverage policies-annual contributions limit is $2,000. Family coverage policies and uninsured individuals with dependents, the annual limit is $4,000.

Direct selling/network marketing organizations market and sell products or services by independent salespeople (person-to-person). More than 43 million people participate in direct selling worldwide. 83% of all direct sellers operate their businesses part-time. Direct selling/network marketing is a rapidly growing industry with U.S. sales of $26.69 billion in 2001. The percentage of American adults who are interested in using the internet as a method of purchasing products and services has increased from 30% of American adults reported in 1997 to 50%

There is a need for improved methods and systems for selling heal related products, service and health care insurance plans through the internet. There is a further need for methods and systems for selling health related products, services and health care insurance plans over the internet where the consumer can benefit from their own purchase and purchased made by others, such that a system is created that tracks points awarded by a service provider system to its members for purchases made through the service provider system.

SUMMARY OF THE INVENTION

Accordingly, an object of the present invention is to provide methods and systems for selling health related products, services and health care insurance plans through the internet.

Yet another object of the present invention is to provide methods for selling health related products and services over the internet through a service provider system that awards points to its member for purchases made by the member himself as well as for those purchases made by members who were referred to the service provider system by the member.

A further object of the present invention is to provide methods for selling health related products and services over the internet through a service provider system that awards debit and or credit cards to its members for purchases.

Another object of the present invention is to provide methods for brokering health savings, health savings security accounts and other similar types of approved health accounts.

Yet another object of the present invention is to provide methods for purchasing health related products and services through the internet through a service provider system that awards points for purchase made, where at least a portion or all of the awarded points are not treated as taxable income for federal income tax purposes at they time they are awarded or used.

A further object of the present invention is to provide methods for brokering health care insurance plans and other health-related insurance plans to members of a service provider system through the internet.

These and other objects of the present invention are achieved in a method of selling a health related product or service via the Internet. A service provider system is provided that includes a web server. The service provider system has members that purchase health related products and services through the service provider system. Applicants are enrolled in the service provider system as members. A product or service request message is received for a desired product or service from a member through a customer interface. The product or service request message includes a product or service identifier. The service provider system transmits a request for the desired product or service request to a supplier of the desired product or service. Points are recorded within a computer memory awarded to a member for purchases made by the member through the service provider system.

In another embodiment of the present invention, a method is provided for selling a health related product or service via the Internet. A service provider system is provided that includes a web server. The service provider system has members that purchase health related products and services through the service provider system. Applicants are enrolled in the service provider system as members. A product or service request message is received for a desired product or service from a member through a customer interface. The product or service request message includes a product or service identifier. The service provider system transmits a request for the desired product or service request to a supplier of the desired product or service. Points are recorded in a computer memory that are awarded to a member for purchases, (i) made by the member itself through the service provider system, (ii) made by members who were referred to the service provider system by the member, and (iii) made by members who were referred to the service provider system by members in (ii).

Another object of the present invention is to provide a method of selling a health related products or services via the Internet. A service provider system is provided that includes a web server. The service provider system enrolls members for purposes of purchasing health related products and services through the service provider system. A product or service request message for a desired product or service is received from a member through a customer interface. The product or service request message includes a product or service identifier. The service provider system transmits a request for the desired product or service request to a supplier of the desired product or service. A recording is made in a computer memory of points awarded to a member for purchases made by the member itself through the service provider system.

In another embodiment of the present invention, a method is provided for selling a health related products or services via the Internet. A service provider system is provided that includes a web server. The service provider system enrolls members for purposes of purchasing health related products and services through the service provider system. A product or service request message for a desired product or service is received from a member through a customer interface. The product or service request message includes a product or service identifier. The service provider system transmits a request for the desired product or service request to a supplier of the desired product or service. A recording is made in a computer memory of points awarded to a member for purchases, (i) made by the member itself through the service provider system, (ii) made by members who were referred to the service provider system by the member, and (iii) made by members who were referred to the service provider system by members in (ii).

In another embodiment of the present invention, a method is provided for selling health related products or services via the Internet. A service provider system is provided that includes a web server. The service provider system enrolls members for purposes of purchasing health related products and services through the service provider system. A product or service request message for a desired product or service is received from a member through a customer interface. The product or service request message includes a product or service identifier. The service provider system transmits a request for the desired product or service request to a supplier of the desired product or service. A recording is made in a computer memory of points awarded to a member for purchases, (i) made by the member itself through the service provider system, (ii) made by members who were referred to the service provider system by the member, and (iii) made by members who were referred to the service provider system by members in (ii). All or at least a portion of the points are not treated as taxable income for federal income tax purposes at they time they are awarded or used. If the awarded points are subject to federal income tax, the service provider system pays all or a portion of the federal tax.

DETAILED DESCRIPTION OF THE PREFERRED EMBODIMENTS

Figure 1:
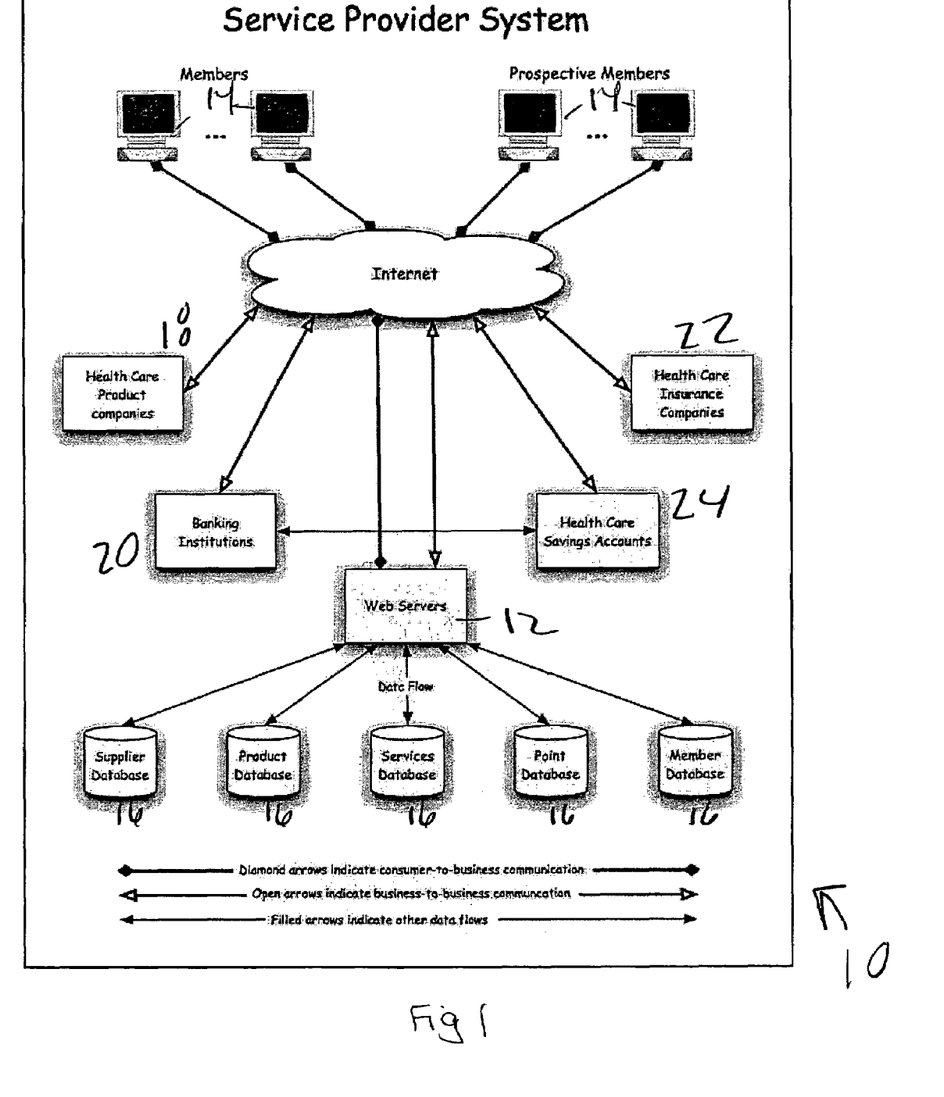
FIG. 1 is schematic block diagram illustrating one embodiment of a service provider system of the present invention.

As illustrated in FIG. 1, one embodiment of the present invention is a system, and its methods of use, for selling health related products, services, health care insurance plans, and the like through the Internet. A service provider system 10 has one or more web servers 12. Service provider system 10 enrolls prospective members as members, collectively members 14, for the purpose of members purchasing health related products, services and health plans through service provider system 10. A product or service request message for a desired product or service is received from a member 14 through a customer interface. The product or service request message includes a product or service identifier.

Service provider system 10 can include a single database, multiple databases, a single database or multiple databases 16, are provided that include information relative to suppliers, products, services, points, members and the like.

Service provider system 10 transmits a request for the desired product or service request from one of its web servers 12 to a supplier of the desired product or service, generally denoted as 18. A determination is made, and then recorded in a computer memory of points awarded to a member for purchases made by the member itself through service provider system 10.

Service provider system 10 is linked with one or more financial institutions 20 for purposes of payment. Payment is made in a variety of different ways, including but not limited to credit/debit cards offered by service provider system 10, credit/debit cards from financial organizations that are part of service provider system 10 community, and the like. In one embodiment, service provider system 10 retains a portion of the purchase price of the product, service or health care insurance plan as its fee.

In one embodiment, service provider system 10 awards a debit and/or credit card to a new or existing member 14 for purchases made through service provider system 10. Service provider system 10 can also be linked to one or more health care providers 22, health care savings accounts, health care security savings accounts (as proposed under H.R. 2596) or similar approved insurance health accounts, collectively 26, and the like.

In one embodiment, points are awarded to members 14 for purchases made through service provider system 16. Points can be awarded to a member 14, in a multi-level implementation, for purchases, (i) made by a first member 14 itself through service provider system 10, (ii) made by members 14 who were referred to service provider system by the first member 14, and (iii) made by members 14 who were referred to service provider system 10 by members 14 in (ii).

Figure 2:
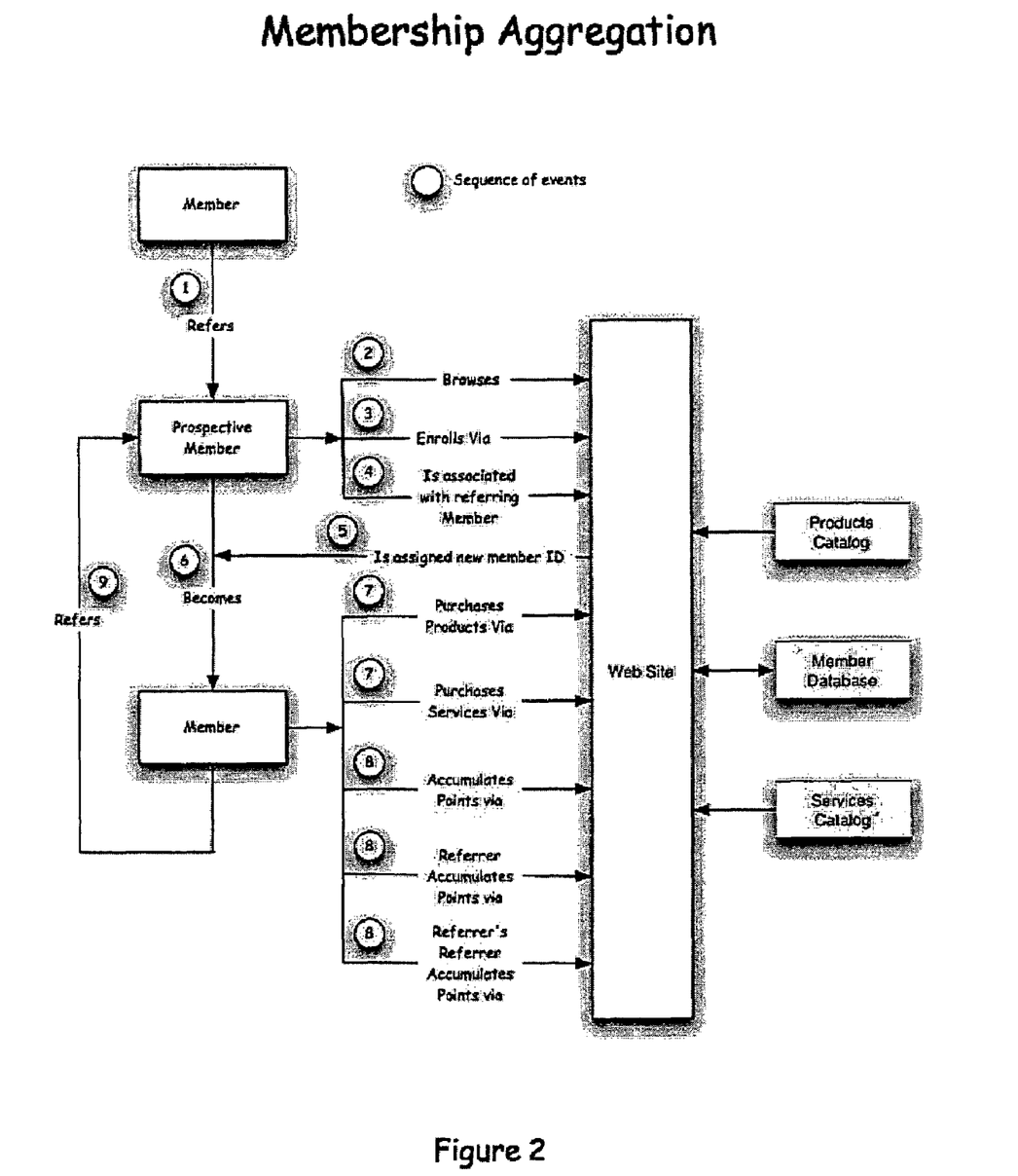
FIG. 2 is a flow chart illustrating one embodiment of the present invention where the purchasing power of members is aggregated in the community of service provider system from FIG. 1, and points are awarded for purchases made through the service provider system.

Referring to FIG. 2, the purchasing power of members 14 are aggregated in the community of service provider system 10. One member 14 can refer applicants to become members 14 of service provider system 14. An applicant decides to enroll in service provider system 10, at which time the new member 14 is then associated with his referred member 14. The new member 14 is assigned a member ID, and becomes a full member 14. As a full member 14, the new member 14 can purchase, products, services, health plans, and the like through service provider system 10. The new member 14 begins to accumulate points and can also refer new members 14 to service provider system 10, from which the new member 14 now receives points for purchases made by his referred members 14 who become registered with service provider system 10. The loop then continues, with new referrals of members 14, back up a chain to the original member 14 that initiated the referrals.

Members 14 can utilize the points for a variety of different applications, including but not limited to, (i) application to a health savings account or a similarly approved account, (ii) offset costs associated with a health savings account or a similarly approved account, (iii) application to a health savings security account or a similarly approved account, (iv) offset costs associated with a health savings security account or a similarly approved account, and the like.

Members can view listings of available products and services through a browsable catalog. A product database 16 provides a listing of different products including but not limited to, vitamins or nutritional supplements, energy/protein bars, health food products, weight loss products, non-prescription drugs, prescription drugs, contact lenses and associated supplies, dermatology/skin care products, oral care products, fitness products, fitness clubs, health books, health and fitness magazines, health insurance, wellness insurance, disability insurance, dental insurance, pet insurance, allergy and asthma products, diabetes products addiction treatment and rehabilitation treatment centers, athletic clothing and gear, therapeutic and chiropractic products, pet care and medication products, exercise equipment, and the like.

A service database 16 provides a listing of different services including but not limited to, services associated with health savings accounts, services associated with health savings security accounts or a similarly approved account, banking services, insurance services, services from a medical information websites, physician guides and hospital rating guides, preventative care and wellness services, nurse hotlines, health network charitable foundation services, preventative care and wellness services, and the like.

Figure 3:
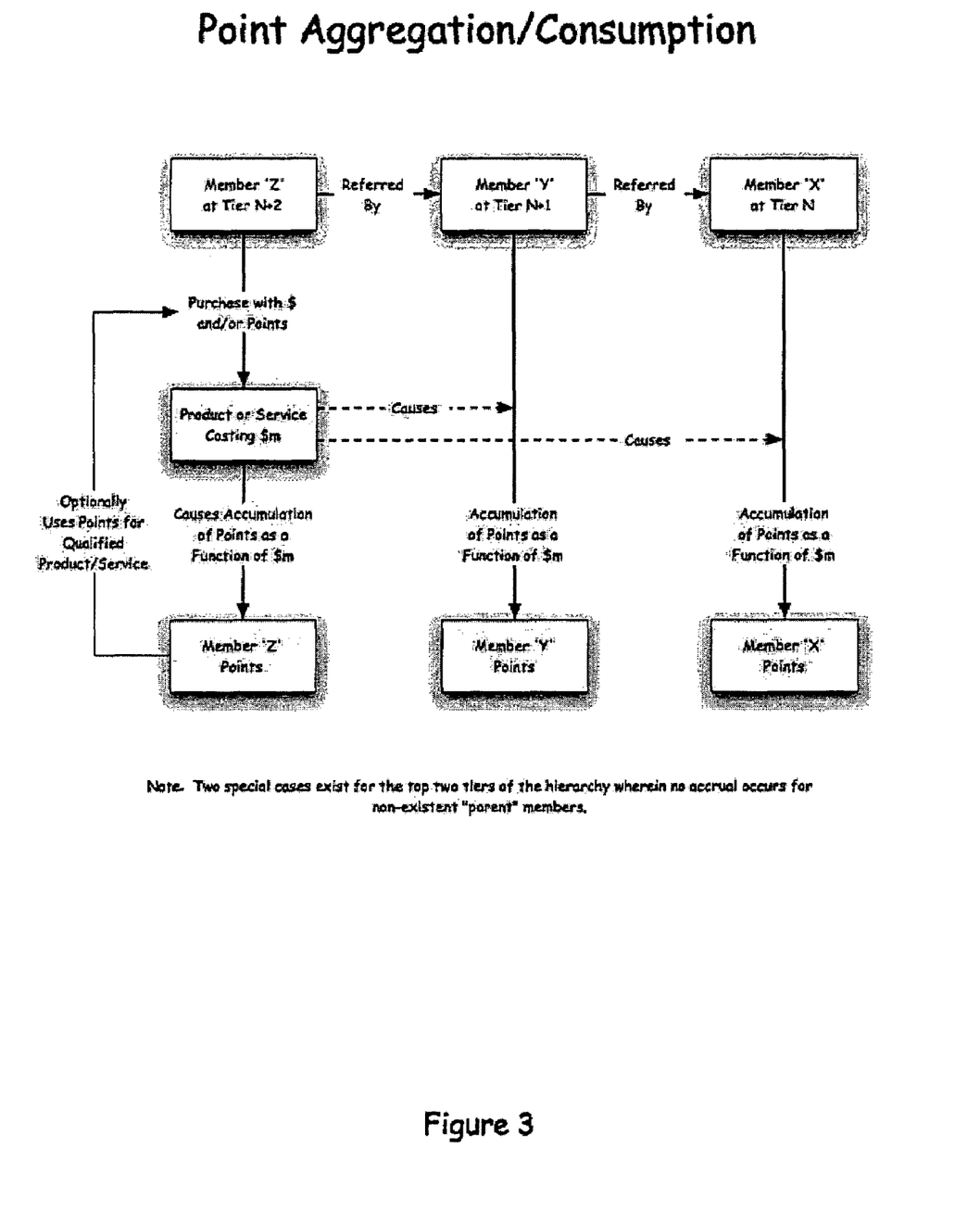
FIG. 3 is a flow chart illustrating an embodiment of the present invention where point aggregation is achieved in a multi-level referral system.

By way of illustration, in one embodiment of the present invention, as shown in FIG. 3, point aggregation can be achieved in a multi-level referral system. By way of illustration, a member "z" purchases a product, service of health care insurance plan through service provider system 10 for "m" dollars. This causes an accumulation of points for member z based on the m dollars. Member "y" also accumulates points based on the purchase of the product because member y referred member z to service provider system 10. The number of points awarded to members z and y can be the same or different. Member z can utilize points for all or a portion of the purchase price of the product if member z has pre-existing points at the time of the purchase of the product. Member "x" receives points as a function of the dollar amount m, because member x referred member y, who in turn referred member z. The points awarded are typically integral numbers of a percentage of the purchase price x.

Figure 4A:
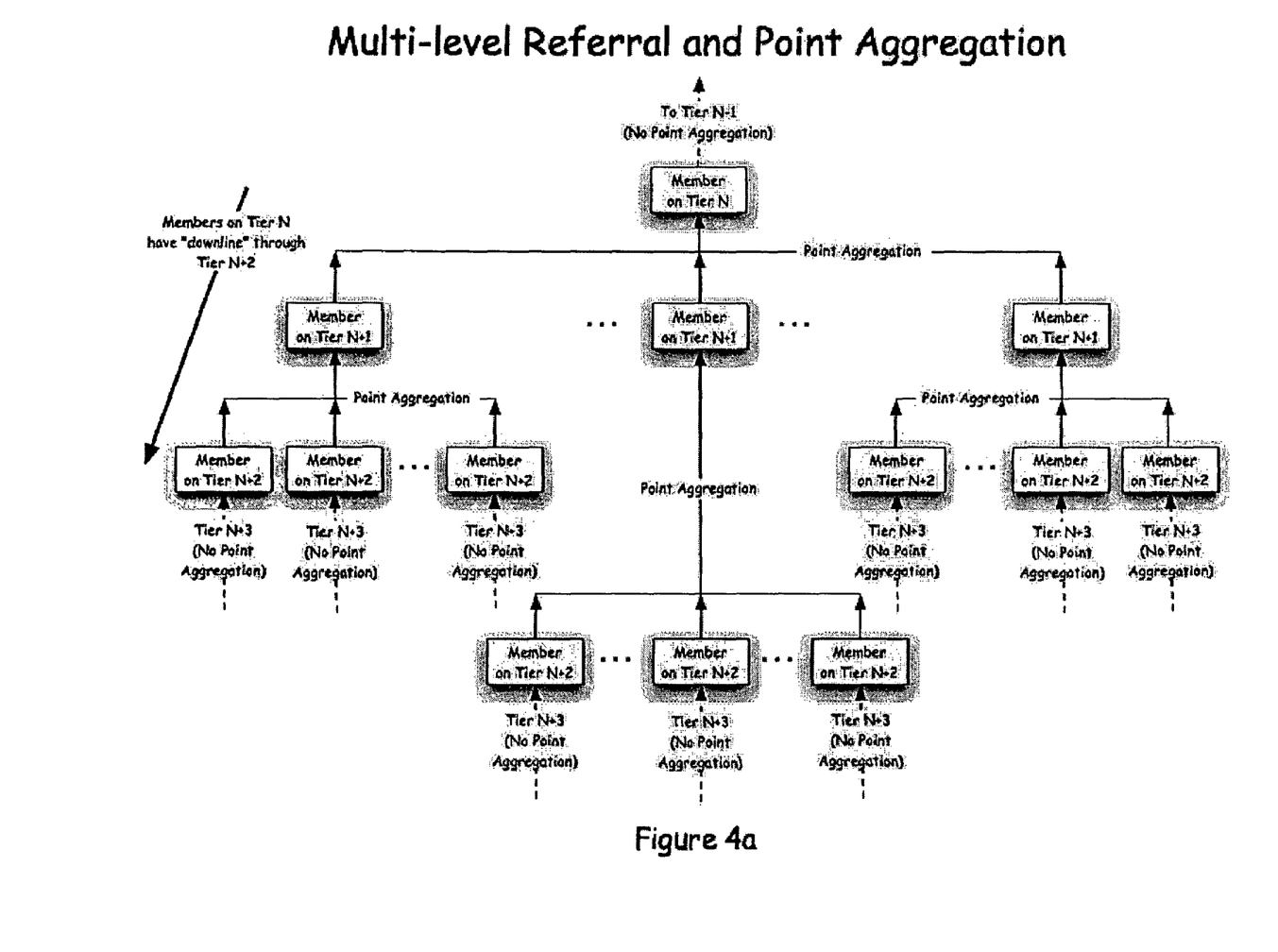
FIG. 4(a) is a flow chart illustrating one embodiment of the present invention with point aggregation in a multi-level referral system.
Figure 4B:
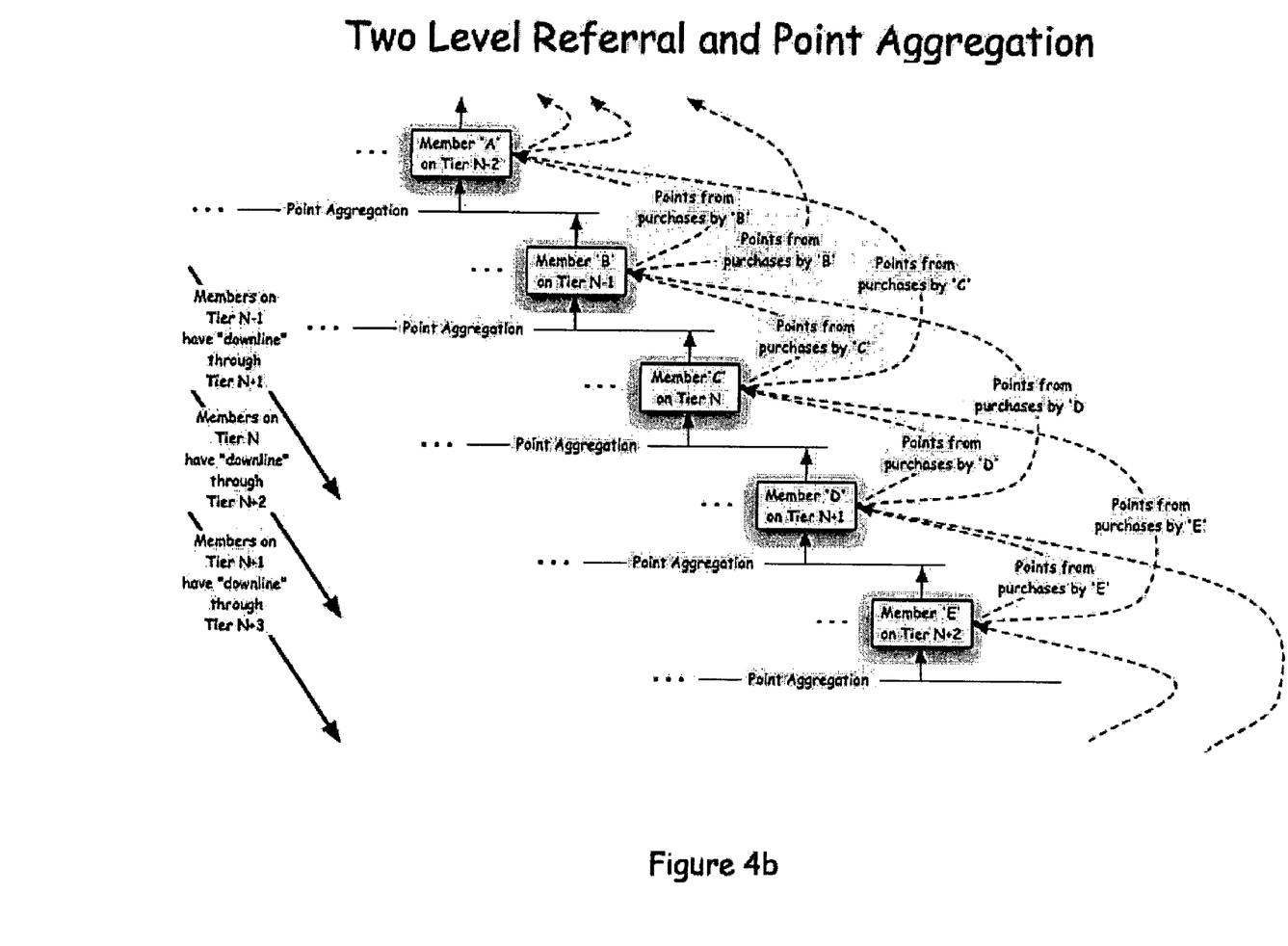
FIG. 4(b) is a flow chart illustrating one embodiment of the present invention with a two-level referral system with awarded points flowing only two levels up for referrals.

One example of point aggregation, is a multi-level referral system illustrated in FIG. 4(*a*). Once members 14 have enrolled in service provider system 10, the relationships of the members 14, for purposes of points, are based on a multi-level referral system where the award of points flows upwards to the referring members 14. It will be appreciated that the member 14 who makes the actual purchase also receives points. One, two or more levels of point aggregation for referrals can be utilized. A two-level referral embodiment, where points flow only two levels up for referrals, is illustrated in FIG. 4(*b*).

Figure 5:
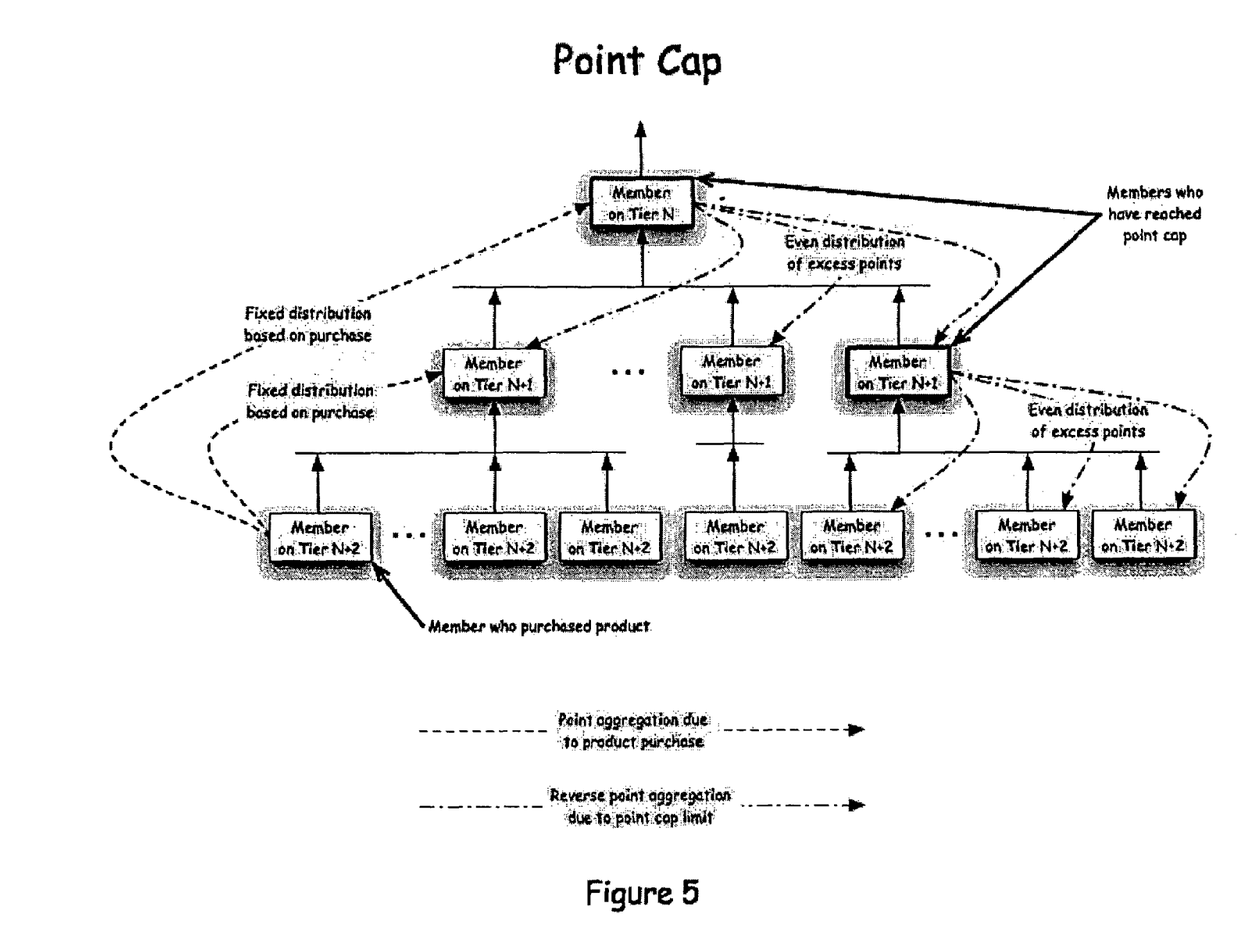
FIG. 5 is a flow chart illustrating one embodiment of the present invention where there are caps on the amount or value of points awarded to a member.

In various embodiments, service provider system 10 can place caps, or limits, on the number or value of points awarded to a member 14. FIG. 5 illustrates that a member 14 at a higher level has exceeded the points that he is allowed to aggregate for a selected period of time. These excess points can be awarded, (i) to those members 14 who are referrals and referrals of referrals of the member 14 who exceeded the cap, (ii) to other third party members 14 enrolled in service provider system 10, (iii) to charitable organizations in the community of service provider system 10, and (iv) the excess points can be lost relative to the exceeding member 14 but still remain in the community of service provider system 10 (for use by service provider system 10).

Figure 6:
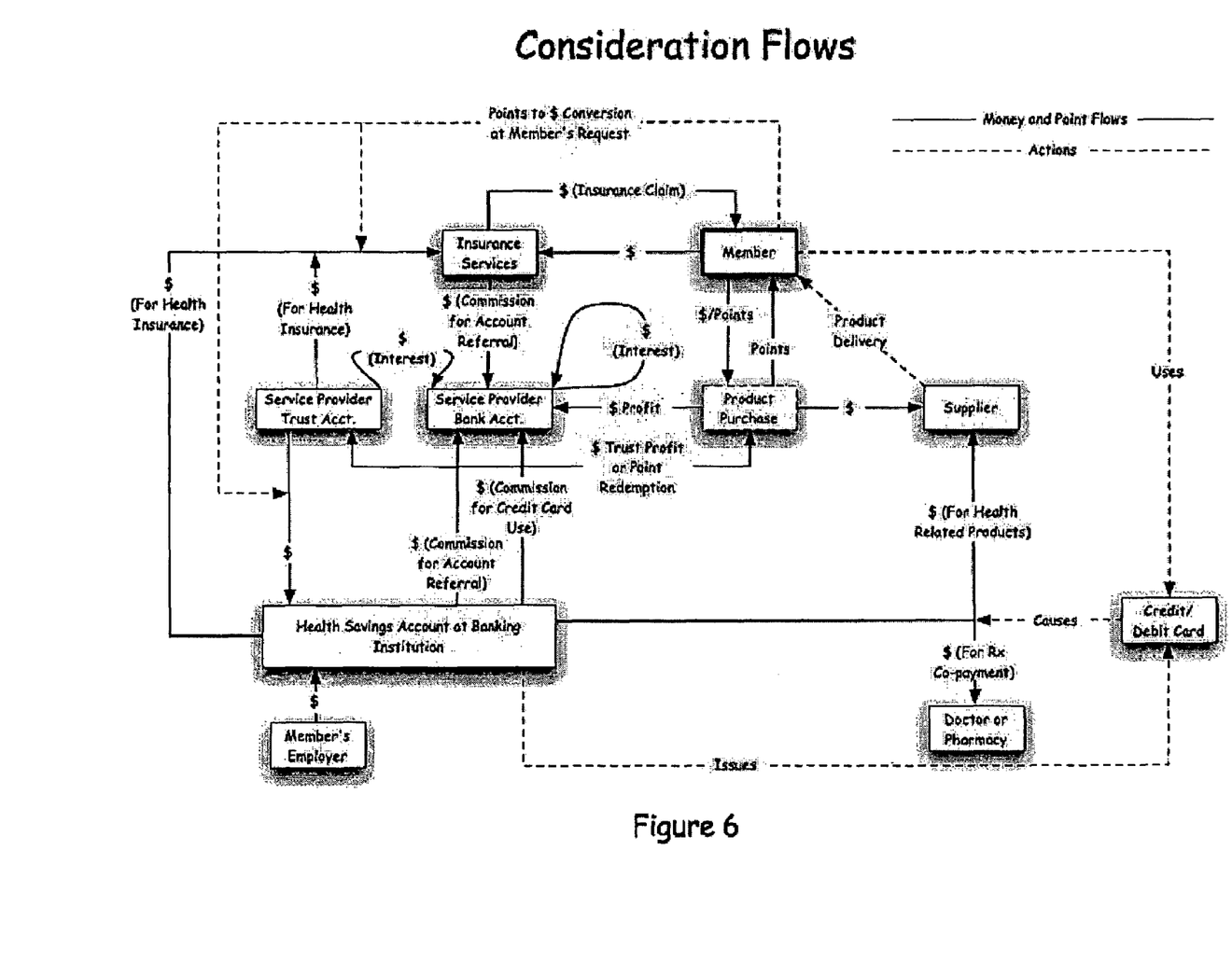
FIG. 6 is a flow chart illustrating various flows of consideration, in one embodiment of the present invention, which can be in the form of financial remuneration to the service provider system and financial institutions, and points to members.

The various flows of consideration, which can be in the form of financial remuneration to service provider system 10 and financial institutions, and points to members 14, are shown in FIG. 6. A member 10 spends dollars and/or points for a product purchase. This event causes dollars to flow to the supplier of the product or service who ships the product or service to the purchaser. The product purchase creates a profit that is awarded to service provider system 10, which is forwarded to the financial account and/or trust account of service provider system. The dollars in the trust account directly correlate to the points awarded by service provider system 10, as well as the points aggregated and awarded to members 14 in the multi-level referral system.

A member can purchase a health care insurance plan, other health-related insurance through service provider system 10 at any time, even after his initial enrollment. A member can also utilize his points, and apply them to pay for all or a portion of his costs of a health savings account, health savings security account, or other similarly qualified/approved health accounts, even if the account was not acquired through the service provider system. Examples of health care insurance plans include but are not limited to, defined health care insurance plan where at least a portion of its costs are funded by tax free dollars and the like.

In one embodiment, the defined health care insurance plan is at least partially funded by an employer's contributions, and points can be used by the employee, if the employee is a member, through service provider system 10 to offset the employee's costs. At least a portion of the costs of a member's 10 health care insurance plan or other health-related insurance can be payable with points awarded by service provider system 10 to a member 14 for purchases made by that member 14 through service provider system 10. Points can be applied to the costs of a health care insurance plan or other heath related insurance plan in one year, and if not used in that year rolled over to costs for subsequent years. Members 14 can be initially enrolled in heath care plans and other types of health-related insurance plans outside of service provider system 10, and then use their purchases, through service provider system 10 in the form of points, to offset and pay for their associated costs and fees of the health care insurance plan and health related insurance that are not covered by their employers, and the like.

In one embodiment, at least a portion of the points awarded by service provider system 10 are treated as non-taxable income for federal income tax purposes. In another embodiment, at least a portion of the points awarded by service provider system 10 that are applied to a health care insurance plan through service provider system 10, including but not limited to heath savings accounts, health savings securities accounts or a similarly approved account, are treated as non-taxable income for federal income tax purposes at they time they are awarded or used.

In one embodiment, points awarded by service provider system 10, may have one or more of the following limitations on their use, (i) be transferable by a member 10 only to an exempt organization for use in fulfilling its exempt purpose, (ii) be not convertable to cash or a cash equivalent, (iii) have a limited life, (iv) have a lifetime that does not exceed than 24 months, (iv) be used as a discount on future purchases of products or services through service provider system 10 only by the member who earned them.

Figure 7:
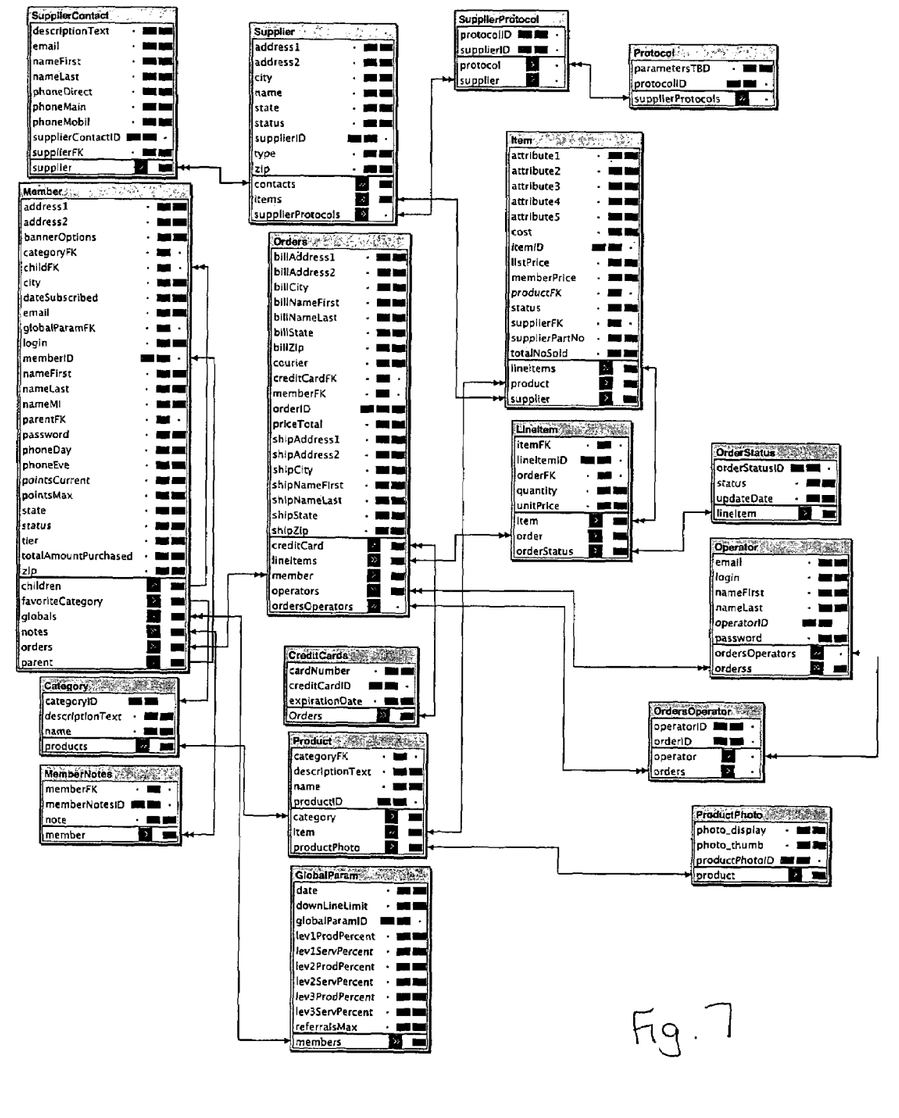
FIG. 7 is illustrates schemas of tables in a relational database that can be utilized with the FIG. 1 embodiment of the present invention.

By way of illustration, and without limitation, schemas of tables in a relational database that can be utilized with the present invention are illustrated in FIG. 7. A single arrow indicates a to-one relationship, a double arrow indicates a to-many relationship. Each box is a table in the database. Each box has attributes (data fields) and relationships.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A method of selling a health related product or service via the internet, comprising:

providing a service provider system that includes a web server, the service provider system having members that purchase health related products and services through the service provider system; enrolling applicants in the service provider system as members, the service provider system including a service database that provides a listing of insurance services, the service provider system providing an aggregation of members purchasing power through the service provider system;

receiving a product or service request message for a desired product or service from a member through a customer interface, the product or service request message including a product or service identifier; transmitting by the service provider system a request for the desired product or service request to a supplier of the desired product or service; awarding tax free points to a member, the tax free points having characteristics of, being transferable by the member to an exempt organization for use in fulfilling its exempt purpose, not convertible to cash or a cash equivalent and having a limited life, the tax free points being granted for purchases, (i) made by the member itself through the service provider system, (ii) made by members who were referred to the service provider system by the member, and (iii) made by members who were referred to the service provider system by members in (ii);

recording within a computer memory the tax free points;

using the tax free points to purchase health related products and services through the service provider system; limiting the points that can be awarded to the member over a selected period of time by a cap; and determining an amount of the points recorded within the computer memory that exceed the cap; and distributing the points that exceed the cap of the member to one or more of: members in (ii), members in (iii), and charitable organizations so that the exceeded points remain in a community of the service provider system.

2. The method of claim 1, wherein at least a portion of the points are utilized by members for future purchases of products or services through the service provider system.

3. The method of claim 1, wherein at least a portion of the points are utilized by members for application to a health savings account or a similarly approved account.

4. The method of claim 1, wherein at least a portion of the points are utilized by members to offset costs associated with a health savings security account or a similarly approved account.

5. The method of claim 1, further comprising: aggregating the purchasing power of the members in the service provide system.

6. The method of claim 1, wherein at least a portion of the points are utilized by members to offset costs associated with a health savings security account or a similarly approved account.

7. The method of claim 1, further comprising: aggregating the purchasing power of the members in the service provide system.

8. The method of claim 1, wherein all of the points awarded by the service provider system remain within a community defined by the service provider system.

9. The method of claim 1, wherein the points can only be used as a discount on future purchases of products or services through the service provider system by the member who earned them.

10. The method of claim 1, wherein the products are selected from vitamins or nutritional supplements, energy/protein bars, health food products, weight loss products, non-prescription drugs, prescription drugs, contact lenses and associated supplies, dermatology/skin care products, oral care products, fitness products, fitness clubs, health books, health and fitness magazines, health insurance, wellness insurance, disability insurance, dental insurance, pet insurance, allergy and asthma products, diabetes products addiction treatment and rehabilitation treatment centers, athletic clothing and gear, therapeutic and chiropractic products, pet care and medication products, and exercise equipment.

11. The method of claim 1, further comprising: assigning to a member a debit or credit card.

* * * * *